Patented Oct. 16, 1934

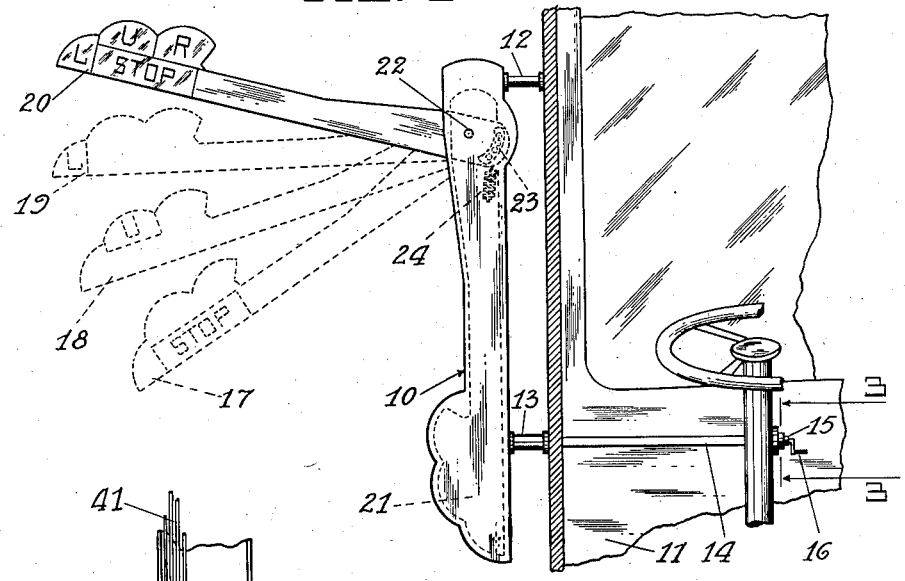
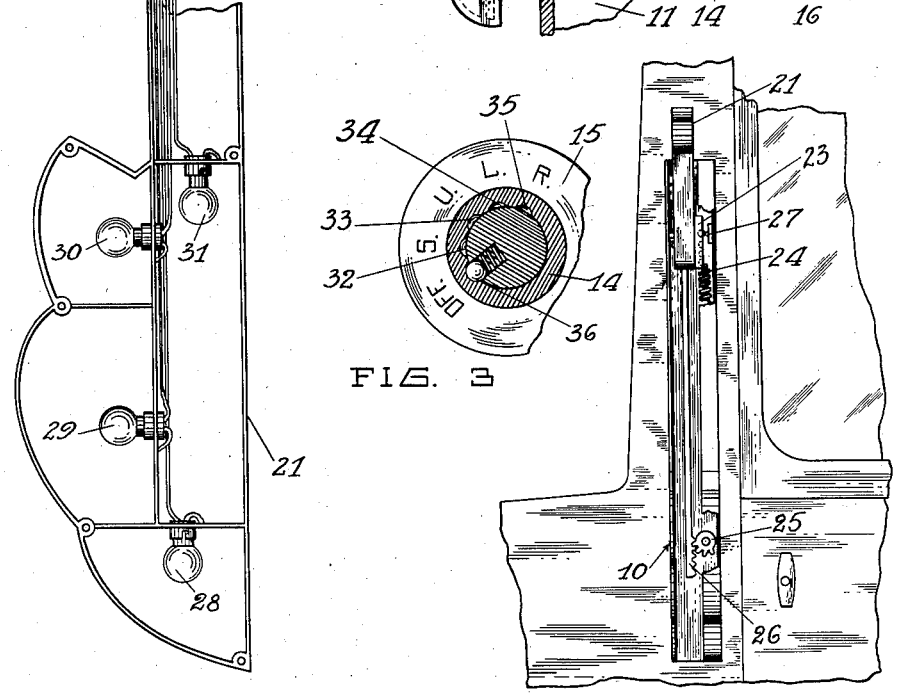

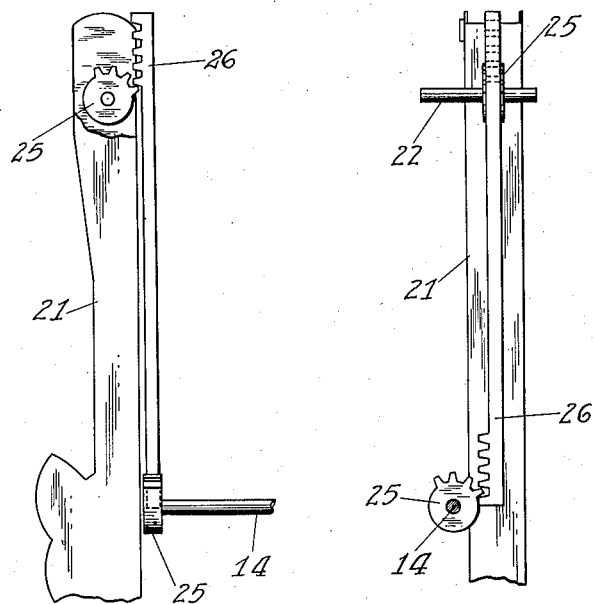
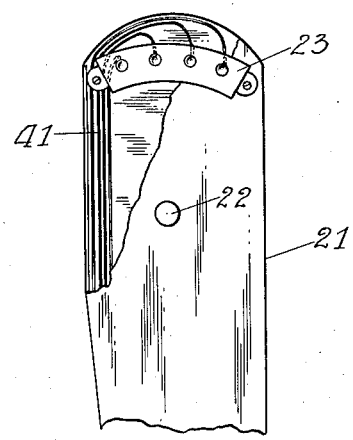

1,977,586

UNITED STATES PATENT OFFICE 1,977,586

VEHICLE DIRECTIONAL SIGNAL

Joel B. Kingsley, San Francisco, Calif., assignor of one-half to William Langdon Shimmon, Keyes, Calif.

Application January 26, 1932, Serial No. 588,847

1 Claim. (Cl. 116—52)

The present invention relates generally to new and useful improvements in directional signals for vehicles, but more particularly to signals of the illuminated semaphore type, consisting specifically of a semaphore manually operated from the driver's compartment by means of a crank, rack and gear mechanism which causes the semaphore to be raised to any desired position such as stop, left turn, U turn and right turn. Each compartment of the semaphore is provided with an electric globe of the 6–8 volt type and the current is independently controlled by the actuation of the semaphore, which may be seen by the driver of the car approaching from either direction affording better manipulation of the approaching automobile.

The primary object of the present invention is to provide a vehicle directional signal that is positive in operation and having few parts.

Another object of the present invention is to provide a vehicle directional signal that may be effective either by day or night.

Another object of the present invention is to provide a vehicle directional signal that may be manufactured at a nominal cost to the autoist.

Still another object of the present invention is to provide a vehicle directional signal that may be placed at either side or the rear of the vehicle.

Still another object of the invention is to provide a vehicle directional signal that may be observed from a greater distance than the ordinary signal commonly used today.

Other objects and advantages of the invention will become apparent with reference to the subjoined specification and the accompanying two sheets of drawings in which:—

Figure 1 is a front view illustrating the position of my invention showing the different positions of the semaphore when attached to the left side of the dash of the motor vehicle.

Figure 2 is a side view illustrating the position of the semaphore when actuated.

Figure 3 is an enlarged fragmentary sectional view of the means used to indicate the position of the semaphore taken on the line 3—3 of the Figure 1.

Figure 4 is a fragmentary view of the lamps and lamp compartment with the semaphore cover removed.

Figure 5 is a front view of the actuating mechanism.

Figure 6 is a side view of the actuating mechanism.

Figure 7 is an enlarged fragmentary view of the semaphore illustrating the position of the commutator and wiring diagram.

Referring more particularly to Figure 1 of the drawings which illustrates the invention the numeral 10 designates the improved vehicle directional signal per se, illustrating its position relative to the automobile body 11 to which it is rigidly fixed at the points 12 and 13. The actuating shaft 14 is attached to the housing 15 and is actuated by the crank 16 and is attached to the steering column and serves to raise the semaphore to positions 17, 18, 19 and 20. The semaphore 21 is pivotally fixed at the point 22 and carries a commutator 23 and also a spiral spring 24 which serves as a counter weight to the semaphore 21.

As indicated in Figures 2, 5 and 6 of the drawings the gear 25 and the rack 26 serve to raise the semaphore 21 to the desired positions. The contact maker 27 engages the commutator 23 which connects the wiring system 41 and serves to distribute the current of the lighting system to the light globes 28, 29, 30 and 31.

The housing 15 is provided with cavities 32, 33, 34 and 35 which engage the spring actuated ball 36 and serve to hold the semaphore 21 at any desired position shown on the housing 15.

What I claim and desire to secure by Letters Patent of the United States is the following:—

In a signaling device of the class described, a casing adapted to be mounted upon one side of a vehicle, a rock shaft mounted in the upper end of said casing, a swingable signal arm carried by said shaft, an actuating shaft mounted in the lower end of said casing, pinions carried by said rock shaft and said actuating shaft, a slidable rack mounted in the casing and engaging said pinions to cause the actuation of said signal arm, a bearing for the actuating shaft and means carried by said bearing and said shaft for holding the arm in selected signaling position, said means including a spring pressed ball and a series of openings selectively engageable by said ball.

JOEL B. KINGSLEY.